(12) United States Patent
Saito

(10) Patent No.: US 6,798,595 B2
(45) Date of Patent: Sep. 28, 2004

(54) MAGNETIC RECORDING PLAYBACK DEVICE

(75) Inventor: Kazutoshi Saito, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 126 days.

(21) Appl. No.: 09/936,416
(22) PCT Filed: Jan. 12, 2001
(86) PCT No.: PCT/JP01/00122
§ 371 (c)(1),
(2), (4) Date: Nov. 26, 2001
(87) PCT Pub. No.: WO01/52259
PCT Pub. Date: Jul. 19, 2001

(65) Prior Publication Data
US 2003/0058564 A1 Mar. 27, 2003

(30) Foreign Application Priority Data
Jan. 12, 2000 (JP) .................. 2000-003479

(51) Int. Cl.⁷ .................................. G11B 5/09
(52) U.S. Cl. .......................... 360/53; 360/31
(58) Field of Search .................. 360/53, 77.04, 360/31

(56) References Cited
U.S. PATENT DOCUMENTS 5,386,324 A * 1/1995 Fry et al. ............... 360/31
5,896,355 A   4/1999 Sako et al.
6,204,660 B1  3/2001 Lee
6,411,452 B1 * 6/2002 Cloke ..................... 360/51

FOREIGN PATENT DOCUMENTS

| CN | 1140881 A | 1/1997 |
|---|---|---|
| CN | 1202700 A | 12/1998 |
| EP | 743642 | 11/1996 |
| JP | 7-7440 | 1/1995 |
| JP | 7-306758 | 11/1995 |
| JP | 8-63905 | 3/1996 |
| JP | 8-293802 | 11/1996 |
| JP | 8-315515 | 12/1996 |

* cited by examiner

Primary Examiner—David Hudspeth
Assistant Examiner—Rocio Colon
(74) Attorney, Agent, or Firm—Wenderoth, Lind & Ponack, L.L.P.

(57) ABSTRACT

In a magnetic recording playback device, since minimum redundant bytes required for satisfying a target error rate are added, the addition of more redundant bytes than are necessary is reduced, whereby overwrite of the drive due to the redundant bytes is reduced. The size of redundant bytes to be added in a formatter block is varied according to the defect condition or electric characteristic of a medium on which data are to be written, or the electric characteristics of a write head for writing the data and an MR head for reproducing the written data.

6 Claims, 4 Drawing Sheets

|  | head 0 | head 1 | head 2 | ..... | head n |
|---|---|---|---|---|---|
| zone 0 | 2 | 2 | 2 | ..... | 2 |
| zone 1 | 2 | 3 | 5 | ..... | 3 |
| ⋮ | ⋮ | ⋮ | ⋮ | ..... | ⋮ |
| zone n | 4 | 5 | 4 | ..... | 4 |

PATENT

MAGNETIC RECORDING PLAYBACK DEVICE

TECHNICAL FIELD

The present invention relates to a magnetic recording playback device, such as a hard disk drive, and, more particularly, to a mechanism which can easily change the error correction capability according to the situation.

BACKGROUND ART

In a conventional magnetic recording playback device, an error correcting code which satisfies a target error rate has been developed, at the developmental stage of the device, in consideration of the playback output of an MR (magneto-resistive effect element) head, the SNR (input/output noise ratio), the defect conditions of mediums, and the like.

As an error correction code generally used in the magnetic recording playback device, there is a Reed-Solomon code (hereinafter, referred to as RS code). This is a method of representing a data sequence to be recorded by utilizing an element of a Galois field at a certain level, performing a division by employing a generating polynomial, and adding the remainder of the division, as redundant bytes, to the end of data to be transmitted. When the correction capability is enhanced, the redundant bytes increase as a tradeoff. Further, when a strong error correcting code is added to a massive data sequence, the arithmetic processing for encoding/decoding becomes complicated, thereby arising a problem of correction processing rate.

Accordingly, there has generally been utilized an interleaving configuration in which a massive data sequence is divided into plural blocks, and redundant bytes that satisfy a target error rate are added to each block. For example, for one sector (512 bytes) of a hard disk, redundant bytes having the capability of correcting several bytes (2n bytes in the case of n-fold correction) are added to data, and the data having a predetermined size (512+2n bytes) is transmitted. However, as the recording density is increased, the redundant bytes tend to be larger to maintain the error rate and, therefore, the redundant bytes would be a factor which further increases overhead of the drive (load on the system).

The conventional magnetic recording playback device is constituted as described above, and redundant bytes that satisfy a target error rate are uniformly added to data in predetermined block units. However, the same amount of redundant bytes are added to all of the data blocks when coding is carried out, regardless of the condition of tracks on which data are to be recorded or the electric characteristics of a write head and an MR head, and therefore, the redundant bytes cause an undesirable tendency toward an increase in overhead of the drive.

The present invention is made in view of the above-described problems and has for its object to provide a magnetic recording playback device which can reduce overhead of a drive due to redundant bytes, while maintaining a target error rate.

SUMMARY OF THE INVENTION

A magnetic recording playback device according to a first aspect of the present invention comprises a recording magnetic head for recording or deleting data on/from a magnetic record medium; a playback magnetic head for reproducing the recorded data; a parameter acquiring means for acquiring plural parameters relating to the operating characteristic of the recording medium and the operating characteristics of the respective magnetic heads, when the respective magnetic heads perform writing/reading operations; a redundant data adding means for adding redundant data having a predetermined number of bytes to data before being written in the recording medium; a data encoding means for encoding the data to which the redundant data is added; an error correction capability value storage means which holds plural error correction capability values each corresponding to a combination of the parameter relating to the operating characteristic of the recording medium and the parameters relating to the operating characteristics of the respective magnetic heads; and a control means for selecting an error correction capability value corresponding to the parameters acquired by the parameter acquiring means from the error correction capability values stored in the error correction capability storing means, and controlling the redundant data adding means so that it adds redundant data having a predetermined number of bytes according to the selected error correction capability value to the data to be recorded.

According to a second aspect of the present invention, the magnetic recording playback device defined in the first aspect further comprises a decoding means for selecting an error correction capability value corresponding to the parameters acquired by the parameter acquiring means from the error correction capability values stored in the error correction capability storing means, and performing decoding on the basis of the selected error correction capability value when reproducing the data to which the redundant data having a predetermined number of bytes are added.

According to a third aspect of the present invention, in the magnetic recording playback device defined in the first aspect, when the error correction frequency at data reproduction deviates from a predetermined value, the control means changes the error correction capability values stored in the error correction capability value storing means in accordance with the change in the error correction frequency at data reproduction.

As described above, the magnetic recording playback device according to the first aspect of the present invention comprises a recording magnetic head for recording or deleting data on/from a magnetic record medium; a playback magnetic head for reproducing the recorded data; a parameter acquiring means for acquiring plural parameters relating to the operating characteristic of the recording medium and the operating characteristics of the respective magnetic heads when the respective magnetic heads perform writing/reading operations; a redundant data adding means for adding redundant data having a predetermined number of bytes to data before being written in the recording medium; a data encoding means for encoding the data to which the redundant data is added; an error correction capability value storage means which holds plural error correction capability values each corresponding to a combination of the parameter relating to the operating characteristic of the recording medium and the parameters relating to the operating characteristics of the respective magnetic heads; and a control means for selecting an error correction capability value corresponding to the parameters acquired by the parameter acquiring means from the error correction capability values stored in the error correction capability storing means, and controlling the redundant data adding means so that it adds redundant data having a predetermined number of bytes according to the selected error correction capability value to the data to be recorded; and the number bytes is varied according to the situation in such a manner that low-level redundant bytes are added to a region where the error frequency is low while high-level redundant bytes are added to a region where the error frequency is high. Therefore, the number of redundant bytes can be variable, whereby reduction in overhead of the magnetic recording playback device can be achieved easily.

Furthermore, according to the second aspect of the present invention, the magnetic recording playback device defined in the first aspect further comprises a decoding means for selecting an error correction capability value corresponding to the parameters acquired by the parameter acquiring means from the error correction capability values stored in the error correction capability storing means, and performing decoding on the basis of the selected error correction capability value when reproducing the data to which the redundant data having a predetermined number of bytes are added. Therefore, the data to which the redundant bytes are effectively added can be decoded with efficiency.

Furthermore, according to the third aspect of the present invention, in the magnetic recording playback device defined in the first aspect, when the error correction frequency at data reproduction deviates from a predetermined value, the control means changes the error correction capability values stored in the error correction capability value storing means in accordance with the change in the error correction frequency at data reproduction. Therefore, even when the use environment changes by aging or the like, the error correcting efficiency can be maintained in accordance with the change, whereby a highly reliable device can be provided.

DETAILED DESCRIPTION OF THE INVENTION

Embodiment 1

Hereinafter, a magnetic recording playback device according to a first embodiment of the present invention will be described with reference to FIG. 1.

Figure 1:
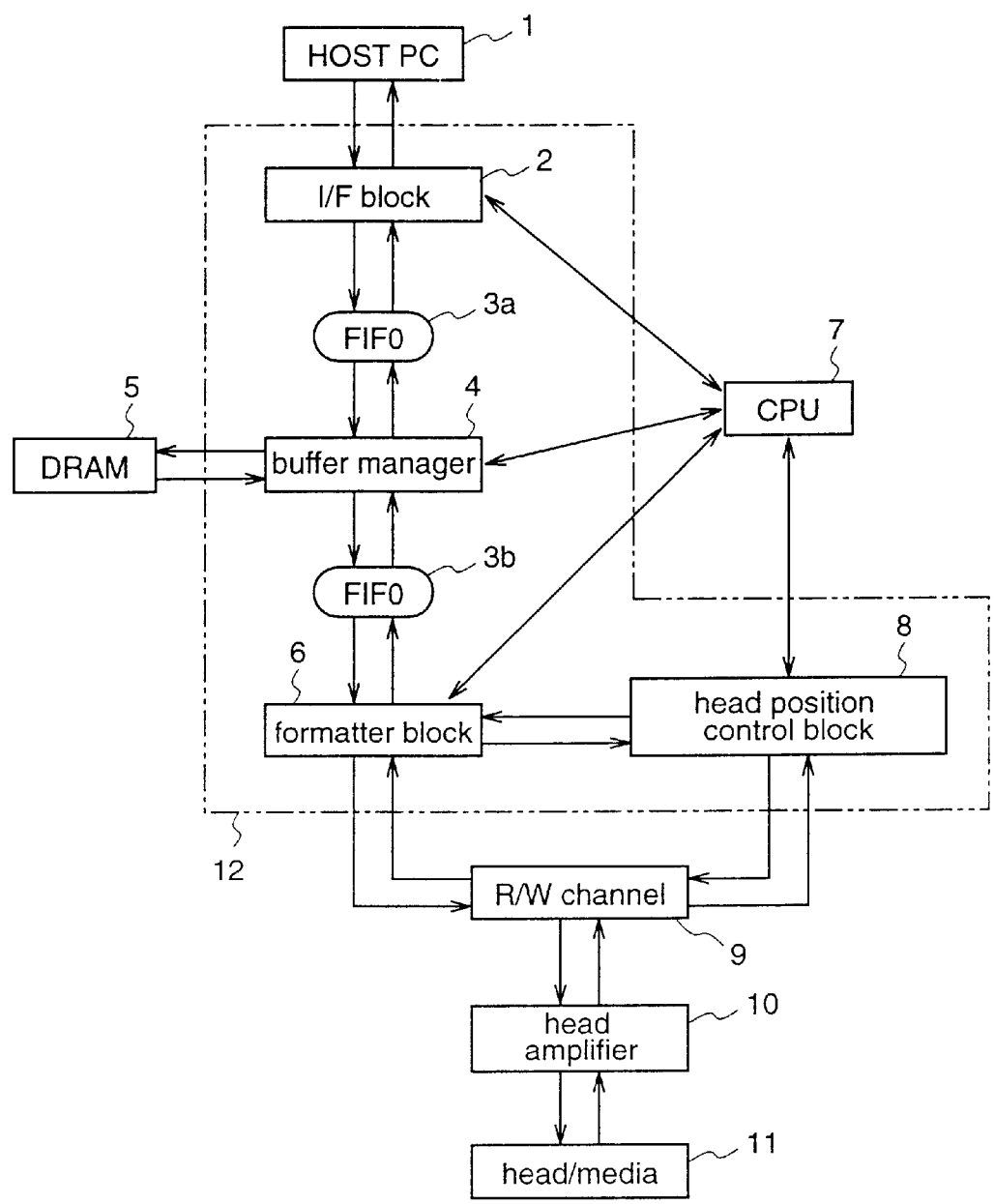
FIG. 1 is a diagram illustrating the construction of a data transmission system of a magnetic recording playback device according to a first embodiment of the present invention.

In FIG. 1, numeral 1 denotes a host computer (HOST PC), and numeral 12 denotes a hard disk controller (HDC) connected to the host computer 1. Further, numeral 2 denotes an input/output interface block of the HDC 12. Numerals 3a and 3b denote FIFOs for smoothing input/output data transmission, and numeral 4 denotes a buffer manager for controlling data reading from a DRAM buffer 5.

Numeral 8 denotes a head position control block for controlling a head position with respect to a medium during reading/writing, according to an instruction from a CPU 7. Numeral 6 denotes a formatter block for executing encoding and decoding of data. Numeral 7 denotes the CPU for monitoring the input/output interface block 2, the buffer manager 4, the formatter block 6, and the head position control block 8, and totalizing various kinds of parameters, such as the defect condition of a medium in an HDD, the output SNR, and the like, to store required error correction capability values for each zone and each head.

Further, numeral 9 denotes a R/W channel, numeral 10 denotes a head amplifier, and numeral 11 denotes a write head, an MR head and a medium. In the above-described construction, the formatter block 6 implements a redundant data adding means, and the CPU 7 implements a parameter acquiring means, an error correction capability value holding means, a control means, a data decoding means, and a decoding means.

Next, the operation at writing or reading will be described. Initially, at writing, data to be written are supplied from the HOST PC 1 to the input/output interface block 2. The data inputted to the output/input interface block 2 are temporarily stored in the DRAM buffer 5 through the FIFO 3a. Thereafter, the data are inputted to the formatter block 6 through the FIFO 3b. This input of data to the formatter block 6 is carried out in units of 512 bytes. At this time, the DRAM buffer 5 is searched for an error correction capability value which has previously been determined according to a zone or track on which writing is to be carried out and the performance of the write head or MR head, and an interleaving configuration in the formatter block 6 is controlled on the basis of the error correction capability value.

Then, redundant bytes are added to the written data in the formatter block 6 according to the interleaving configuration, and the data are encoded. When the encoding is completed, the encoded data are transmitted to the R/W channel 9 and recorded on the medium 11 through the head amplifier 10.

On the other hand, at reading, initially, the DRAM buffer 5 is searched for an error correction capability value at the reading position, according to a combination of a zone or track position where the written data are to be read and a head, and then the interleaving configuration in the formatter block 6 is controlled on the basis of the error correction capability value. That is, the data which have been transmitted through the head amplifier 10 and the R/W channel 9 are subjected to decoding in the formatter block 6 which is set at an error correction capability value of the same configuration as the interleaving configuration which had been set when writing of the data was carried out, and only required data are outputted to the HOST PC 1.

Next, a description will be given of a specific example of an encoding process using the magnetic recording playback device which is constructed as described above, with reference to FIGS. 2 to 6.

Figure 2:
FIG. 2 is a diagram illustrating an input/output data sequence in/from the above-described magnetic recording playback device.
Figure 3:
FIG. 3 is a diagram illustrating a data structure of one-fold interleaving in the above-described magnetic recording playback device.
Figure 4:
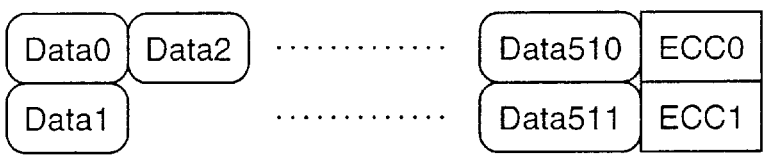
FIG. 4 is a diagram illustrating a data structure of two-fold interleaving in the above-described magnetic recording playback device.
Figure 5:
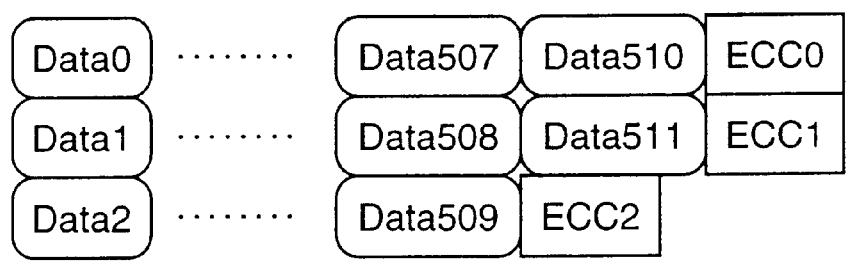
FIG. 5 is a diagram illustrating a data structure of three-fold interleaving in the above-described magnetic recording playback device.

FIG. 2 shows a data sequence to be transmitted from the DRAM buffer 5 to the formatter block 6. FIG. 3 shows an example of encoding in a case where the error correction capability value is "1", i.e., the interleaving configuration is "1", and this figure shows that one redundant byte is added to a data sequence of 512 bytes. FIG. 4 shows an example of encoding in a case where the error correction capability value is "2" (two-interleaving configuration), and this figure indicates that a data sequence of 512 bytes is divided into two sequences each comprising 256 bytes, and one redundant byte is added to each sequence of 256 bytes. FIG. 5 shows an example of encoding in a case where the error correction capability value is "3" (three-interleaving configuration), and this figure indicates that a data sequence of 512 bytes is divided into three sequences comprising 171 bytes, 171 bytes, and 170 bytes, respectively, and one redundant byte is added to each of the sequences. The correction capabilities of the redundant bytes added to the respective interleaved sequences are equal. For example, assuming that the correction capability is m bytes, m-byte correction can be performed for the 512-byte data sequence in the one interleaving configuration shown in FIG. 3, and m-byte correction can be performed for each 256-byte data sequence in the two interleaving configuration shown in FIG. 4, and m-byte correction can be performed to the 171-byte or 170-byte data sequence in the three interleaving configuration shown in FIG. 5.

Figure 6:
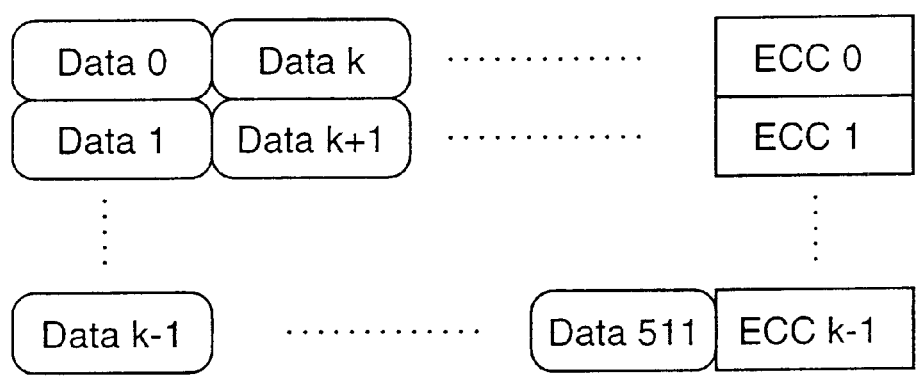
FIG. 6 is a diagram illustrating a data structure of k-fold interleaving in the above-described magnetic recording playback device.

Generally, when a data sequence of 512 bytes is divided into k pieces of interleaved sequences and subjected to encoding, an interleaving configuration as shown in FIG. 6 is obtained, and k pieces of redundant bytes are added. In the present invention, since the interleaving configuration at data writing/reading is variable, addition of excessive redundant bytes is suppressed, and the required minimum redundant byte can be added, whereby the overhead of the magnetic recording device can be reduced.

Next, a description will be given of selection of an error correction capability value which is stored in the above-mentioned CPU 7.

Figures 7, 8:
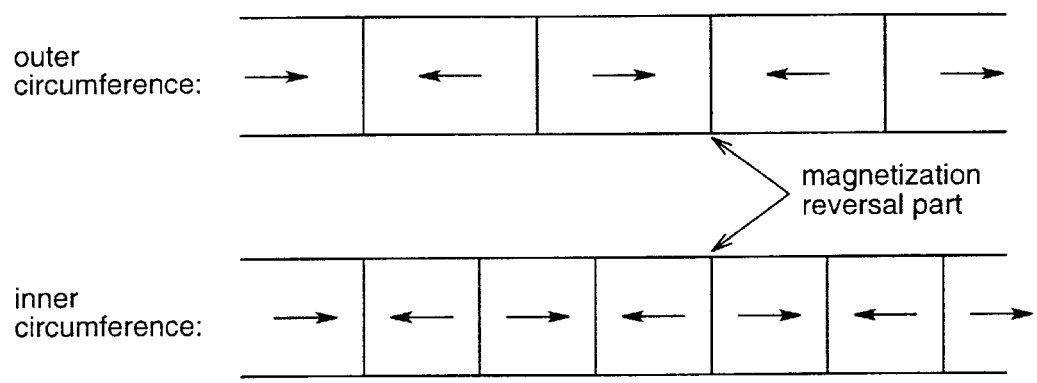
FIG. 7 is a diagram for explaining a difference in minimum magnetization inversion intervals between zones on a magnetic recording medium in the above-described magnetic recording playback device.
FIG. 8 is a diagram illustrating a case where an interleaving configuration is set for every combination of zones and heads in the above-described magnetic recording playback device.

Generally, a magnetic recording playback device contains plural magnetic recording mediums, and write heads and MR heads corresponding to the recording mediums. However, the defect conditions at the surfaces of the magnetic recording mediums and the performances of the write heads and the MR heads for writing and reading data into/from the recording mediums vary in each magnetic recording playback device. Further, as shown in FIG. 7, the minimum magnetization inversion interval is not uniform on a magnetic recording medium, and it becomes narrower from the outer circumference toward the inner circumference and, therefore, the error rate of the magnetic recording playback device varies according to the position on the magnetic recording medium. So, the first embodiment of the present invention will be described taking, as an example, a case where the formatter block 6 can vary the interleaving configuration up to a five-interleaving configuration at the maximum, with reference to FIG. 8.

As shown in FIG. 8, all of the tracks on the magnetic recording medium are divided into several zones, and an interleaving configuration which satisfies a target error rate is examined in advance for each combination of a zone and a write head and an MR head for writing and reading data into/from the zone. Thereby, as shown in FIG. 8, at the outer circumference, such as zone 0 or zone 1, where a relatively favorable error rate can be expected, the redundant bytes are reduced by reducing the number of interleaved sequences. On the other hand, at the inner circumference where errors tend to occur frequently, the number of interleaved sequences is increased, and redundant bytes are added so as to satisfy the target error rate in total. Thereby, the overhead of the drive due to the redundant bytes can be significantly reduced as compared with the conventional case where redundant bytes are added by the maximum interleaving configuration for satisfying a target error rate, to all of data to be written into the hard disk.

Further, if the error correction frequency becomes larger than a predetermined value during use of the device due to aging or the like, the data stored in the CPU 7 may be updated or corrected so that the table of the correction capability values shown in FIG. 8 is changed, whereby more intensive correction can be performed.

As described above, according to the first embodiment of the present invention, when encoding data to be recorded, the size of redundant bytes to be added in the formatter block 6 is varied on the basis of the data stored in the CPU7, according to the defect condition or electric characteristic of the medium 11 in which data are to be written, or the electric characteristics of the write head for writing the data and the MR head for playing the written data. Therefore, encoding can be carried out at high speed, and overhead of the drive can be reduced.

APPLICABILITY IN INDUSTRY

In a magnetic recording playback device, since minimum redundant bytes required for satisfying a target error rate are set variably, the addition of more redundant bytes than are anecessary to data to satisfy the target error rate is reduced, whereby overwrite of the drive due to the redundant bytes is reduced.

What is claimed is:

1. A magnetic recording playback device comprising:
   a recording magnetic head for recording or deleting data on a magnetic record medium;
   a playback magnetic head for reproducing the recorded data;
   parameter acquiring means for acquiring plural parameters relating to an operating characteristic of the magnetic recording medium and operating characteristics of said recording and playback magnetic heads when said recording and playback magnetic heads perform the recording and reading operations, respectively;
   redundant data adding means for adding redundant data having a predetermined number of bytes to data before the data is written on the magnetic recording medium;
   data encoding means for encoding the data to which the redundant data is added;
   error correction capability value storage means for holding plural error correction capability values each corresponding to a combination of the parameter relating to the operating characteristic of the magnetic recording medium and the parameters relating to the operating characteristics of said recording and playback magnetic heads; and
   control means for selecting an error correction capability value corresponding to the parameters acquired by said parameter acquiring means from the error correction capability values stored in said error correction capability value storing means, changing an interleaving configuration of the data, and controlling said redundant data adding means so that said redundant adding means varies and adds the redundant data having the predetermined number of bytes to the data to be recorded according to the selected error correction capability value.

2. A magnetic recording playback device as defined in claim 1, further comprising decoding means for selecting the error correction capability value corresponding to the parameters acquired by said parameter acquiring means from the error correction capability values stored in said error correction capability value storing means, and performing decoding on the basis of the selected error correction capability value when reproducing the data to which the redundant data having the predetermined number of bytes are added.

3. A magnetic recording playback device as defined in claim 1, wherein when an error correction frequency at data reproduction deviates from a predetermined value, said control means changes the error correction capability values stored in said error correction capability value storing means in accordance with the change in the error correction frequency at data reproduction.

4. A magnetic recording playback device comprising:

a recording magnetic head operable to record or delete data on a magnetic record medium;

a playback magnetic head operable to reproduce the recorded data;

a processor operable to acquire a plurality of parameters relating to an operating characteristic of the magnetic recording medium and operating characteristics of said recording and playback magnetic heads when said recording and playback magnetic heads perform the recording and reading operations, respectively;

a formatter block operable to add redundant data having a predetermined number of bytes to data before the data is written on the magnetic recording medium and encode the data to which the redundant data is added;

a memory operable to store a plurality of error correction capability values each corresponding to a combination of the parameter relating to the operating characteristic of the magnetic recording medium and the parameters relating to the operating characteristics of said recording and playback magnetic heads, wherein said processor is also operable to select an error correction capability value corresponding to the acquired parameters from the error correction capability values stored in said memory, change an interleaving configuration of the data, and control said formatter block so that said formatter block varies and adds the redundant data having the predetermined number of bytes to the data to be recorded according to the selected error correction capability value.

5. A magnetic recording playback device as defined in claim 4, wherein said formatter block is also operable to select the error correction capability value corresponding to the parameters acquired by said processor from the error correction capability values stored in said memory, and perform decoding on the basis of the selected error correction capability value when reproducing the data to which the redundant data having the predetermined number of bytes are added.

6. A magnetic recording playback device as defined in claim 4, wherein when an error correction frequency at data reproduction deviates from a predetermined value, said processor changes the error correction capability values stored in said memory in accordance with the change in the error correction frequency at data reproduction.

* * * * *